Aug. 25, 1931.                C. H. FEEZER                1,820,790
            STRAINER AND SEDIMENT BOWL FOR GASOLINE TANKS
                         Filed Feb. 11, 1929

INVENTOR.
Clarence H. Feezer
BY *Lancaster and Allwine*
ATTORNEYS.

Patented Aug. 25, 1931

1,820,790

UNITED STATES PATENT OFFICE

CLARENCE H. FEEZER, OF KILGORE, NEBRASKA

STRAINER AND SEDIMENT BOWL FOR GASOLINE TANKS

Application filed February 11, 1929. Serial No. 339,136.

This invention relates to improvements in sediment traps, especially well adapted for use in connection with the trapping of fuel.

The primary object of this invention is the provision of a relatively economical and efficient acting type of sediment trap, which is adapted to be placed upon fuel tanks and the like for the purpose of trapping water and foreign deposits from liquid fuel, in order that the latter may be fed to the carburetor of, say, an internal combustion engine, in a pre-cleaned and efficient condition.

Other objects and advantages of this invention will be apparent during the course of the following detailed description.

In the accompanying drawings, wherein similar reference characters designate corresponding parts throughout the several views, Figure 1 is a fragmentary sectional view taken through a liquid receiving tank, showing the relation of parts of the improved sediment trap.

Figure 1:
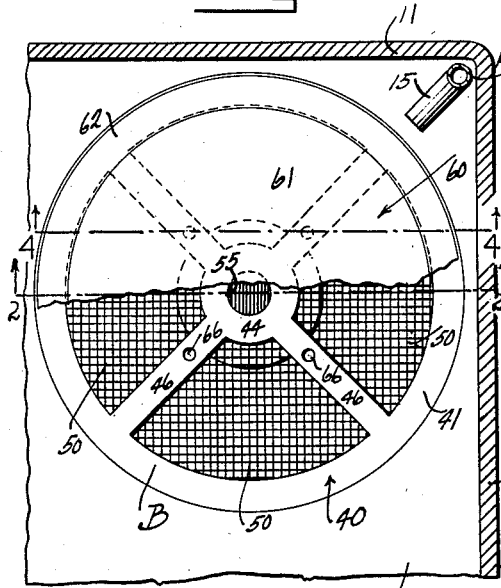
Figure 2:
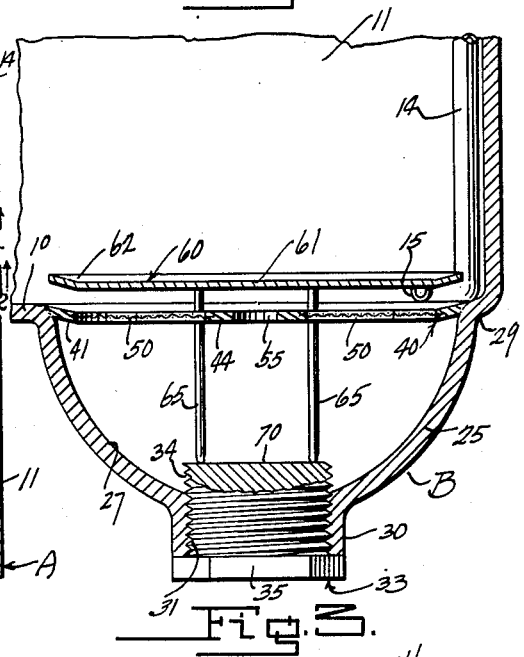
Figure 2 is a sectional view taken substantially on the line 2—2 of Figure 1.
Figure 4:
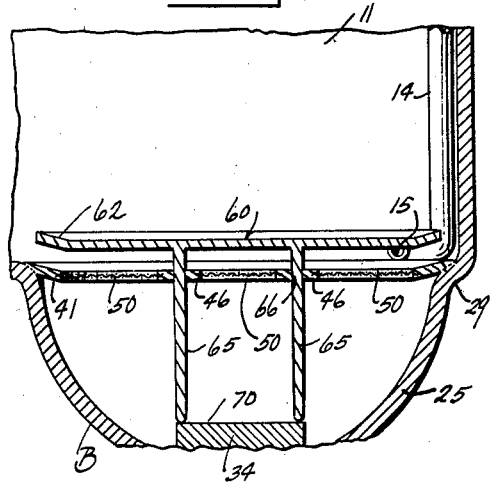
Figure 4 is a sectional view taken substantially on the line 4—4 of Figure 1.

In the drawings, wherein for the purpose of illustration is shown only a preferred embodiment of the invention, the letter A may generally designate a tank, which is adapted to contain any kind of liquid, but in the preferred instance fuel, such as gasoline. In the bottom of the tank A there is disposed the improved sediment trap B.

The tank A is of any approved shape or size. It may be polygonal in form, or cylindrical, and it is provided with a bottom 10, and upstanding walls 11 of any approved character. A filler tube 14 may be provided, having an outlet 15 which flows the gasoline or liquid directly over the top of the sediment trap B, so that the sediment, and especially the foreign particles may be trapped prior to the time that they have an opportunity to enter any other portion of the tank compartment.

The sediment trap B is of a novel and efficient nature. It may be used as an attachment, and in this connection, soldered or otherwise secured upon the tank, or it may be built into the tank. As shown in the drawings, it preferably comprises a sediment receiving bowl 25, which is of half circular formation, having a half circular compartment 27 therein. The bowl 25 is connected at its maximum diameter, peripherally at 29, with the bottom 10 of the tank A, preferably at the lowest level of the sloping bottom 10. The bowl 25, which may be referred to as a casing, or settling chamber, since it is not necessarily bowl-shaped, is provided at its lowermost end with an outlet extension 30, preferably internally screw threaded at 31 for receiving a drain plug 33. The drain plug 33 has a screw threaded shank 34 which plugs into the screw threaded opening 31, and also includes a head 35 which may be polygonal, for wrench engaging purposes, and adapted to seat against the outer edge of the outlet extension 30. A gasket may be employed therewith, if desired, to insure a positive seal.

Disposed over the top of the compartment 27, is a sediment trap, screen or member 40, which includes a ring-shaped frame 41, peripherally soldered or otherwise attached to the bowl 25 or the bottom 10, in overhanging relation at the top of the bowl compartment 27; this ring frame 41 being slightly dished or convergent downwardly towards the axis of the bowl, in order that sediment will more naturally pass over the member 40. A central ring-shaped portion 44 forms part of the member 40, being connected with the ring-shaped outer frame 41, by means of preferably radially disposed arms 46. This spider-like frame, in the openings or spaces between the arms 46 and the frame rings 41 and 44, is provided with fine mesh screening or gauze 50, either wire or of textile material, thru which the finer sediment or solids may pass as they travel thereover. The frame ring 44 is provided with a relatively large central opening 55, thru which the larger foreign particles or sediment may pass and drop into the compartment 27, wherein they are trapped by reason of the screen or gauze material 50 against liability of ever entering the tank compartment. It is to be noted that this sediment entrapping member 50 is disposed in a plane below the inner liquid supporting surface of the tank bottom 10, in order to facilitate the entrapment of the sediment and the cooperative reception thereon of the valve or shut-off plate or member 60.

The shut-off valve or plate 60 is of disc-shaped formation, slightly dished, including the imperforate body portion 61, with an annularly upwardly divergent marginal portion 62 adapted to seat in sealing relation upon the imperforate ring-shaped frame portion 41 of the trapping member 40 above described. The body 61 of the imperforate plate 60 is preferably provided with depending right angled guide pins or extensions 65, preferably four in number, which are reciprocably extended through openings 66 provided in the radial frame arms 46 of the member 40 above described, in order to guide the open or closed movement of the shut-off plate or member 60, so that the same moves parallel with the member 40, at all times. The plug 33 is disposed in such cooperative relation with respect to the pins 65, that the inner surface 70 of its plug shank 34 engages the lower ends of the pins 65, as the plug 33 is screwed into position, and lifts the shut-off plate or valve 60 into a spaced relation above the sediment entrapping screen or member 40, in order that the liquid fuel may pass readily over the member 40, unobstructed by the shut-off plate 60, to permit the sediment and foreign particles therefrom to be received either thru the screening gauze 50 or the central particle receiving opening 55, and entrapped in the bowl compartment 27.

Figure 3:
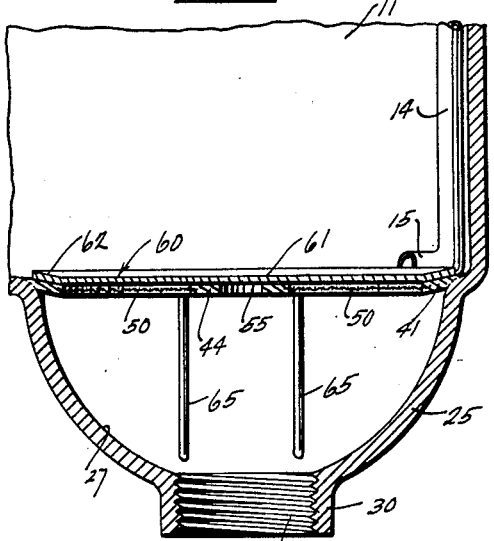
Figure 3 is a view of the parts as shown in Figure 2, with the drain plug removed and the shut-off or valve plate closing the trap for removal of sediment therefrom.

Upon removal of the plug 33, and prior to its entire removal, the plate 60 drops, by gravity, and seats in a sealing relation over the top of the bowl 25, sealing off the compartment 27 thereof from the tank compartment, and entrapping the water and sediment in the bowl compartment 27, from which it may be readily drained thru the drain opening 31, upon removal of the plug 33, as can clearly be understood from Figure 3. It is to be thoroughly understood that the plug shank 34 is not entirely removed from the screw threaded drain opening 31, prior to the time that the shut-off plate or valve 50 seats in a sealing relation on top of the entrapment screen 40, to close off the trap compartment 27.

Various changes in the shape, size, and arrangement of parts may be made to the form of invention herein shown and described, without departing from the spirit of the invention or the scope of the claims.

I claim:

1. In a sediment trap the combination of a settlement receptacle having a sediment receiving compartment therein, sediment entrapment means over the top of the receptacle compartment comprising a fine mesh trapping screen provided with an opening therein sufficient to permit large particles to drop therethrough into the compartment, a drain plug for said receptacle, and valve means cooperating with the drain plug upon and entirely over said screen and said opening to close off communication therethrough to the receptacle compartment upon removal of the drain plug.

2. In a sediment trap the combination of a sediment receiving chamber having an entrapping screen annularly arranged on the top thereof in overlapping relation with said chamber, said screen having a central opening of sufficiently large dimension to permit dropping of larger particles of foreign material therethrough into the chamber beneath said screen, a drain plug for the lower part of said chamber, and a shut-off plate above the screen having means associated therewith and resting by gravity upon the plug whereby upon removal of the latter the plate will move to close off admission to the sediment chamber.

3. In a sediment trap the combination of a sediment receiving bowl, a drain plug removably positioned in the lower part of the bowl, the bowl being open upwardly, a spider-like frame over the open portion at the top of said bowl, fine mesh screening material on the spider, the spider having an opening therein surrounded by but unobstructed by the fine mesh screening material and permitting of the dropping of larger particles into the bowl, a shut-off plate of a size adapted to seat directly upon the top of said spider and shut off the bowl at the top thereof, depending pins slidably extending through the spider in a guiding relation for the plate, said pins being of a length to rest upon the drain plug so that when the drain plug is in place the plate will be lifted to permit sediment to enter the bowl and when the plug is removed the plate will drop to close off the top of the bowl.

CLARENCE H. FEEZER.